Sept. 16, 1930.  R. TAEUBERT  1,776,051
AUTOMOBILE DIRECTION SIGNAL
Filed March 12, 1923  2 Sheets-Sheet 1

INVENTOR.
RICHARD TAEUBERT
BY Joseph J. O'Brien
ATTORNEY.

Sept. 16, 1930.   R. TAEUBERT   1,776,051
AUTOMOBILE DIRECTION SIGNAL
Filed March 12, 1923   2 Sheets-Sheet 2
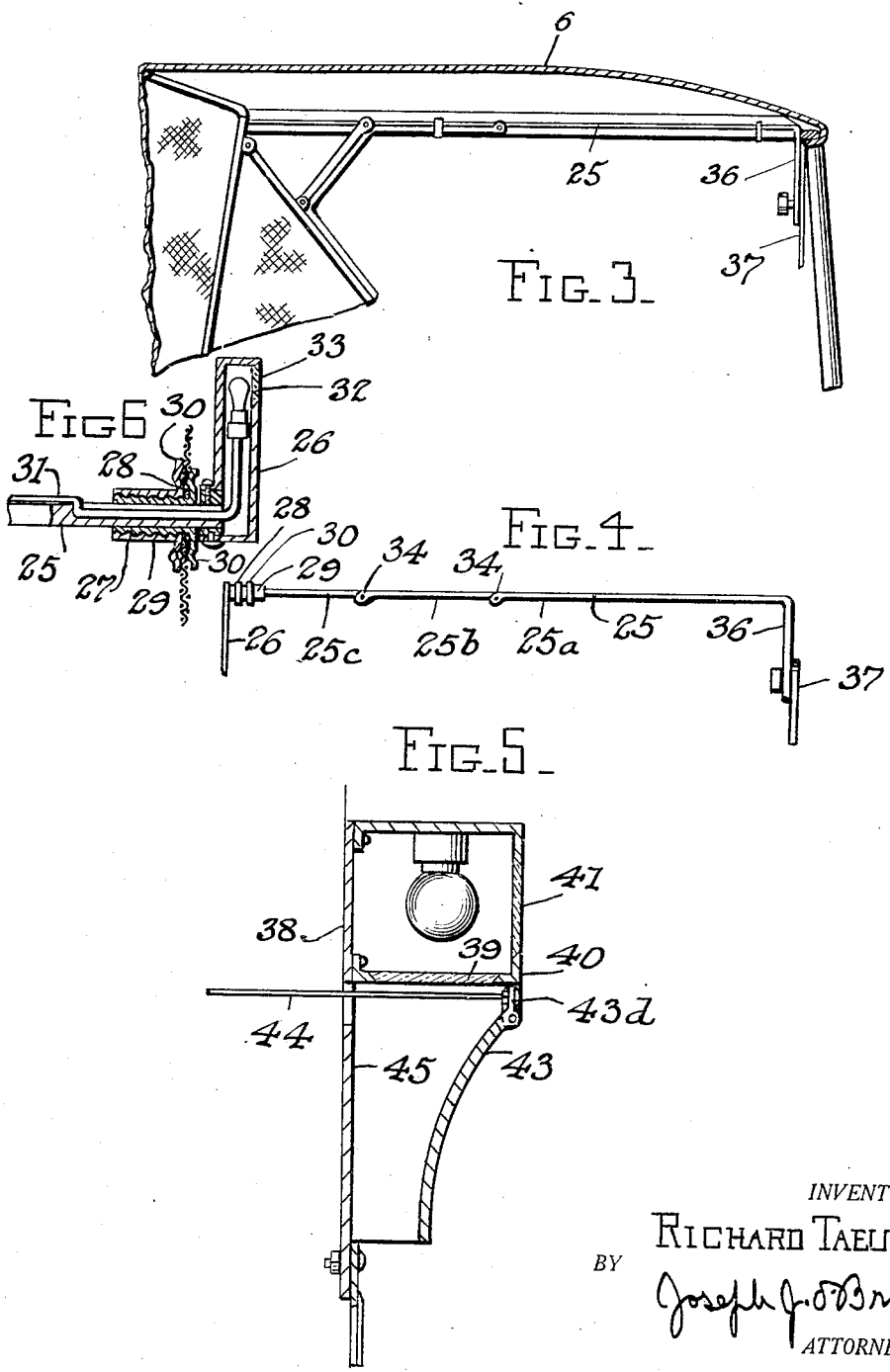
INVENTOR.
RICHARD TAEUBERT
BY Joseph J. O'Brien
ATTORNEY.

Patented Sept. 16, 1930

1,776,051

UNITED STATES PATENT OFFICE

RICHARD TAEUBERT, OF HOLYOKE, MASSACHUSETTS

AUTOMOBILE DIRECTION SIGNAL

Application filed March 12, 1923. Serial No. 624,327.

This invention relates to improvements in direction signalling devices for automobiles and its leading object is to provide a device of this character and control connections for operating a rear end signal which will permit the folding of the vehicle top, without requiring the detachment of the control connections.

With the above and other objects in view the invention consists in certain new and useful constructions and arrangements of parts, clearly described in the following specification and fully illustrated in the accompanying drawings, in which:—

Fig. 3 is a longitudinal sectional view through a vehicle top, showing the overhead shaft.

Fig. 4 is a detail view of the overhead shaft detached.

Fig. 5 is a detail view on an enlarged scale of a bearing clamp and signal arm for the rear end of the vehicle top.

Fig. 6 is a vertical sectional view of a modified form of the invention.

Figure 1:
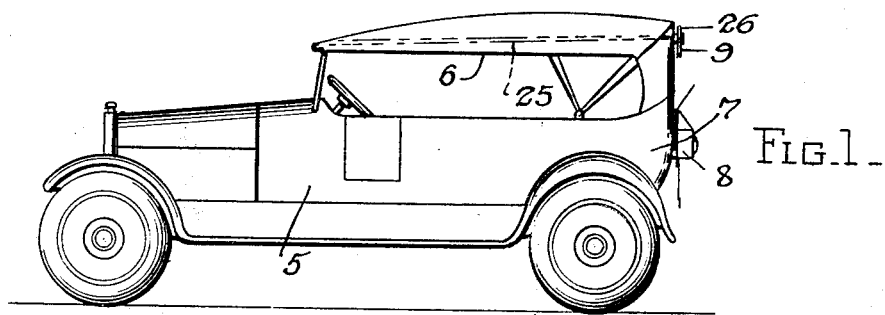
Fig. 1 is a side elevation of a vehicle provided with my improved signalling devices.
Figure 2:
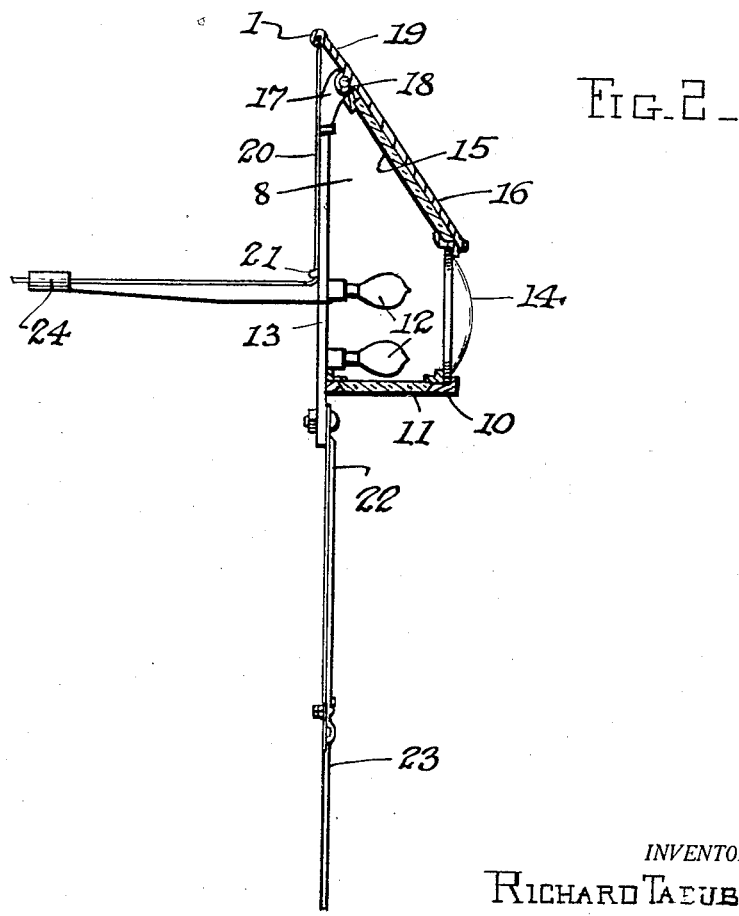
Fig. 2 is a vertical sectional view on an enlarged scale of a rear end signal.

Having illustrated the preferred and modified forms of the signals I will now describe in detail the construction of the same. Referring to Figs. 1 to 5, inclusive, 5 designates a vehicle, such as a standard automobile of the touring car type, with a folding top 6. On the rear end of the body 7 the stop signal box 8 is mounted and on the rear wall of the top 6 the direction signal 9 is mounted.

The stop signal comprises the box 8, the lower wall 10 of which is provided with a white glass window 11, which lies normally under the electric lamps 12, carried by the front wall 13 of said signal box. The rear wall of the signal box consists of a lens 14, suitably mounted in position thereon. This lens is disposed in line with the lamps 12 so that a red light may be cast rearwardly of the vehicle, in accordance with the laws of the various states.

The top wall of the signal is inclined to provide a downwardly and rearwardly sloping window 15, which is normally covered by the upwardly swinging cover or wing 16, which is hinged to the rearwardly deflected post 17, secured on the front wall 13, by means of the hinge lugs 18. The cover or signal plate 16 is provided with a rear edge portion which is designed to overlie the rear edge portion of the top wall, and said signal plate is also provided with a forwardly extending arm 19 which is connected to the cable 20, which is passed downwardly through the eye 21 and thence forwardly to connect with the brake pedal or lever, as the case may be.

The lower marginal edge portion of the front wall 13 projects below the bottom window 11 and carries the license plate 22, and this license plate may carry a town or city name plate 23, suitably bolted thereto.

When the brake pedal or lever is moved in braking direction the signal plate will be shifted to an elevated position so as to disclose the sloping window 15, which is provided with a signal, either in the form of a word, an arrow, or the like. The inner face of the signal plate may carry a similar signal and it may also carry a town or city name plate, in which case the latter would not be attached to the license plate.

Light is prevented from radiating from the window 15 by means of the signal plate, which normally covers said window. When the signal plate is shifted to an elevated position by the operation of the brake lever or pedal the inner face of the signal plate will be exposed to observation from the rear under the light rays from the illuminating lamps. A switch 24 may be connected to the pull cord or cable 20, and to the front wall of the lamp box, so that the lamps will be energized when the pull cord is moved.

The direction signal consists of a shaft 25, the rear end of which carries an arrow 26. The rear end of the shaft extends through an opening formed in the top 6. To support the rear end of the shaft on the top fabric a bearing clamp shown in Fig. 6 may be used, which consists of an inner tube 27, having a rear end flange 28, and an outer tube 29, having a similar flange 30. The two tubes may be threaded on each other so as to bring the flanges thereof into snug clamping engagement with the fabric of the top. The inner tube provides a bearing for the rear end of the shaft 25, and this rear end is shown to have a wire passage therein through which the current wires 31 extend to feed the lamp 32 carried by the signal arm or arrow 26, which is provided with a small window 33 in line with the lamp 32.

The shaft 25 is shown to consist of sections $25^a$, $25^b$ and $25^c$, which are connected with each other by means of pivotal joints 34. These joints are designed to lie in the planes of the pivots of the sections of the top frame, as indicated in Fig. 3, so that the shaft may easily fold with the top. The shaft is supported on the side bar $6^a$ of the top frame $6^b$ by means of spring clips or the like 35.

The forward end of the shaft is provided with an angular handle 36 to which the front signal arm 37 is secured, as by the pivot 38, which is provided with a handle 39, whereby the entire shaft 25 may be manipulated from the driver's seat by an overhead motion of his hand. When the handle 36 is turned the rear signal arrow will move in the same direction with the front signal 37. The weight of the signal arm 37 and the handle 36 is sufficient to return the shaft to its normal position, as soon as the driver or operator releases turning pressure therefrom.

In Fig. 6 I show a modified form of the signal box consisting of the box 38, which is provided with a bottom wall 39 having a transparent glass window therein. The rear wall 40 carries the usual red signal glass 41. To the depending arm 42 of the rear wall 40 the signal plate 43 is hinged at its upper end. This signal plate is provided with a small arm $43^a$ to which the operating cable 44 is connected, and which extends forwardly to the brake pedal or lever. The front wall 45 of the signal box carries the license plate, which is in line with the light rays projected through the window of the bottom wall. When the pull cord is operated the signal plate 43 will be elevated so that the signal located on the rear face of the front wall 45 will be exposed to observation from the rear.

Having described my invention I claim:—

A vehicle signal consisting of a shaft having a plurality of hingedly connected sections, means for supporting the shaft on a vehicle folding top so that the pivot connections between the sections thereof will be adjacent the similar pivot connections of the folding top frame, a direction signal carried by the rear end of said shaft and operating against the rear end of the top, and a direction signal carried by the forward end of the shaft and providing a handle for the manual operation of the shaft.

Signed by me at Holyoke, Mass.

RICHARD TAEUBERT.